July 18, 1944.  L. L. WEISGLASS  2,353,979
MEASURING SYSTEM
Filed July 4, 1942
Fig. 1.
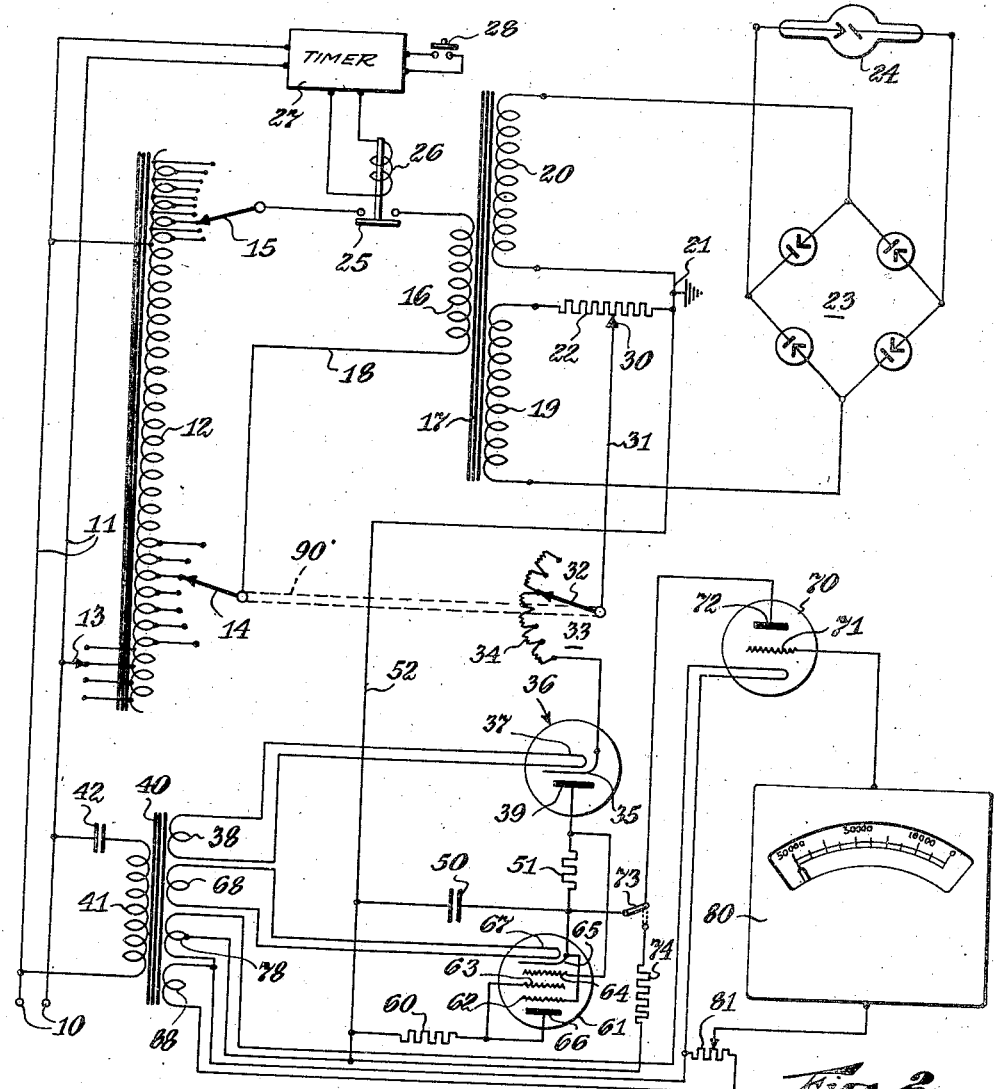
Fig. 3.
Fig. 2.
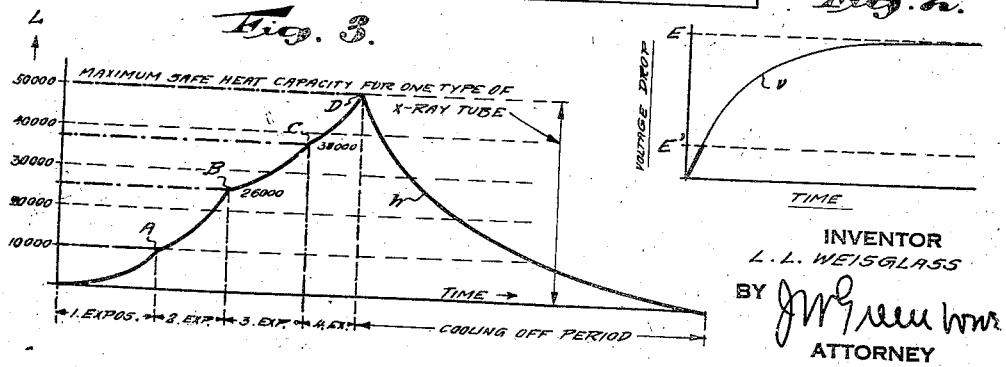
INVENTOR
L. L. WEISGLASS
BY
ATTORNEY Patented July 18, 1944

2,353,979

UNITED STATES PATENT OFFICE 2,353,979

MEASURING SYSTEM

Louis L. Weisglass, New York, N. Y., assignor to Westinghouse Electric & Manufacturing Company, East Pittsburgh, Pa., a corporation of Pennsylvania Application July 4, 1942, Serial No. 449,815

15 Claims. (Cl. 250—95)

The invention relates to X-ray apparatus, and more specifically to measuring systems for indicating the load condition of an X-ray tube in order to prevent overload exposures.

It is known to provide X-ray exposure systems with blocking means for excluding adjustment combinations as regards anode current, anode voltage and exposure time which, when applied to the tube, would result in overheating the tube anode or target. Such means are insufficient when starting the intended exposure with the tube still heated from previous exposures. Furthermore, these blocking devices, as well as the known protective relays for interrupting the tube energization upon the occurrence of overloads, do not permit determining in advance and with sufficient accuracy whether an intended exposure will stay within the safe load limit of the tube, if the exposure is to be started immediately or shortly after a preceding exposure, i. e. with a preheated tube anode.

An object of the invention is to provide means for determining at any moment the thermal condition of an X-ray tube for the purpose of preventing overloads. More particularly, the invention aims at providing a measuring system which affords a visual indication of the instantaneous thermal load condition of the tube caused by the integrated effects of preceding exposures and cooling periods.

A measuring system of this character could be built by using thermometric or pyrometric elements for measuring the target temperature of the tube. However, such directly-measuring systems would involve considerable difficulty. Hence, another object of the invention is to perform the above-mentioned measuring operation with the aid of non-thermal measuring elements and, more particularly, by means of an electrical measuring circuit cooperating with the electrical operating network of the tube.

An object also is to design such a measuring system so as to be automatically adjusted to changes in the energy supply to the X-ray tube, in order to obtain a sufficiently accurate measuring result without requiring other manual adjustments than those ordinarily necessary for operating an X-ray apparatus. A still further object of the invention is to achieve the desired measuring operation by electrical circuit means, i. e. without appreciable mechanical complications of the switch mechanisms and the like control apparatus ordinarily required for X-ray apparatus, and in order to obtain a device of small compass and reliable operation.

According to the invention, an integrating measuring system is connected with the energizing network of the X-ray tube so as to produce a measuring magnitude corresponding to the integer of the electrical loads imposed on the X-ray tube during one or several exposures. This measuring system contains means for reducing the integral load magnitude at a rate of reduction corresponding approximately to the heat dissipation of the tube, in particular during the inoperative intervals between exposures and after the last exposure. An indicating instrument, such as a meter or recorder, is disposed in the measuring system for effecting an indication in accordance with the resultant measuring magnitude. The instrument reading thus obtained is indicative of the thermal condition of the tube and can be calibrated in heat units (kv. ma. sec.)

In another aspect of the invention, the integrating element of the measuring system is an electric capacitor connected with the X-ray apparatus to be charged during exposure periods by a current corresponding to the anode current of the X-ray tube in order to build up a capacitor voltage representative of the anode load, this voltage being measured and indicated by the properly calibrated instrument. A leakage or bleeder resistance, rated for discharging the capacitor in accordance with the cooling rate of the tube, is employed for simulating the effect of the heat dissipation. In this connection, it should be borne in mind that the temperature function of the X-ray tube is related to time $T=f(t)$. This relationship is an exponential function and is similar to the discharge curve of a capacitor when leaking-off or discharging through a resistor, which latter is also an exponential function. By choosing the right resistor (time constant) the temperature function of the X-ray tube and the discharge curve of the capacitor through the resistor can be made to coincide, thus making one the characteristic of the other.

According to another feature of the invention, the charging circuit of the integrating capacitor contains a variable resistance device for adjusting the time constant of the circuit. Preferably, the variable device is coupled with selector means, in particular the kilovoltage selector, of the tube network so that any change in the operating conditions of the tube adjusted by the operator effects automatically, i. e., without requiring attention on the part of the operator, a corresponding adaptation of the measuring system.

It is also a feature of the invention to simplify and improve the accuracy of the measuring operation by inserting into the circuit of the above-mentioned capacitor and bleeder resistance a control device for rendering the resistance inoperative during the charging periods of the capacitor.

The invention involves also a design of the measuring instrument proper so as to indicate directly the instantaneous load capacity of the X-ray tube available for an exposure after any transpired load history of the apparatus.

These and other features as well as further objects of the invention will become apparent from the following description of the embodiment illustrated in the drawing.

Fig. 1 shows a complete circuit diagram of an X-ray apparatus provided with a measuring system according to the invention.

Figs. 2 and 3 are explanatory and show voltage and load characteristics, respectively, with reference to the system of Fig. 1.

The X-ray apparatus represented in Fig. 1 is designed as follows. The operating alternating current is supplied through input terminals 10 to main leads 11 and thence to a regulating device consisting in the embodiment illustrated of an autotransformer 12. The primary connection of this transformer with the main leads 11 includes a selector switch 13 whose selector contacts are connected with corresponding transformer taps. This selector switch serves to adjust the transformer tap according to line voltage. The secondary connections of the transformer include two selector switches 14 and 15 having their respective rows of contacts connected with secondary taps of the transformer coil in order to adjust the anode voltage (kilovoltage) of the tube. Selector switch 13 serves for making rough adjustments, such for example in units of tens, while switch 14 permits a finer selection in terms of units of the desired voltage value. The primary 16 of a high voltage transformer 17 is connected with the selector switches 14 and 15 by a circuit 18. The high voltage secondary of transformer 17 contains two coil sections 19 and 20 whose midpoint is grounded at 21, a potentiometer resistor 22 being inserted in the ground connection. The end points of the secondary coil sections 19 and 20 are connected with a rectifier bridge 23 which in turn is connected with the anode circuit of the X-ray tube 24.

The circuit 18 is led over the contacts 25 of a relay whose relay winding 26 is energized through a timing device 27 fed from the main leads 11 over a timer switch 28. The timing device permits selecting the exposure time and, after being started by operating the switch 28, energizes the winding 26 during the desired period by closing the contacts 25 for a corresponding length of time. The portion of the system described thus far, excepting the arrangement of the potentiometric resistor 22, is substantially similar to customary X-ray apparatus. As mentioned before, the system also provides for selecting the exposure time.

The adjustable contact 30 of the potentiometer resistance 22 is connected by a lead 31 with the movable contact 32 of a resistance device 33 for adjusting the time constant of the measuring circuit, as will be more fully explained in a later paragraph. The group of resistance units of the device 34 is connected to the cathode 35 of a rectifier tube 36. The heater 37 of this tube is fed from a secondary 38 of an auxiliary transformer 40 whose primary 41 is connected with the line 11 in series-connection with a condenser 42 serving to ensure a sufficient voltage stabilization from line fluctuations. The anode 39 of the rectifier tube 36 is connected with a condenser 50 through a resistor 51. The anode circuit 52, extending from the condenser 50, leads to the terminal of the potentiometric resistor 22 next to the grounded midpoint 21, and thus completes the secondary potentiometer circuit. Reviewing briefly the foregoing, it will be seen that the voltage drop between points 30 and 21 of the resistor 22, this voltage drop depending upon the milliamperage of the X-ray tube, causes a corresponding current to flow in the anode circuit 31, 52 of the rectifier 36. Consequently, when the X-ray tube is energized, the condenser 50 is charged over resistance device 33, rectifier 36 and resistor 51 by a current dependent upon the anode current of the X-ray tube.

A discharge or leakage resistor 60 is connected across the condenser 50 through a control tube 61. This tube has three grids 62, 63 and 64 disposed between its cathode 65 and anode 66. Grid 63 and anode 66 are connected to the leakage resistor 60, while the remaining electrodes are connected to both ends of the series resistor 51 respectively. The heating element 67 of the cathode 65 is energized from another secondary 68 of the auxiliary transformer 40.

While, as explained previously, the condenser 50 is charged in accordance with the current supply to the X-ray tube and hence tends to assume a voltage drop indicative of the time-integrated anode load, the leakage resistor 60 serves to simulate the cooling conditions of the X-ray tube, in particular between exposures, and causes a gradual discharge of the condenser 50 in accordance with the declining temperature of the X-ray tube. As a result, the voltage across the condenser 50 at any given moment can be taken as measure of the thermal load condition of the X-ray tube, as hereinbefore explained, provided, of course, the elements of the network are properly rated and adjusted as will be set forth more fully hereinafter.

In order to determine and indicate this voltage drop across condenser 50, a voltmeter tube 70, connected with a meter 80, is provided. The grid 71, here used as an anode, operates with a low A. C. voltage supplied by a secondary 78 of the auxiliary transformer 40. The cathode 72 is connected with the measuring condenser 80, a switch being inserted permitting to sever the connection and to place a resistor 74 in series with the tube circuit for adjusting the zero indication of the meter 80. A potentiometer 81 fed from another secondary 88 of the transformer 41 serves for selecting the necessary plate (grid) voltage of the voltmeter tube 70 when performing the just-mentioned zero adjustment.

While the meter 80 in effect measures a voltage, i. e., the voltage across the measuring condenser 50, it has been shown in the foregoing that the charge imposed on the condenser, and hence the magnitude of the voltage, depends on the power (current and voltage) supplied to the X-ray tube as well as on the exposure time and the cooling conditions of the tube. Consequently, the scale of the instrument 80 is preferably gauged in heat units (kv. ma. sec.) ranging from zero to the permissible time maximum, the latter being usually determined by the thermal load maximum of the X-ray anode.

In order to obtain an accurate indication and an instrument scale of simple gradation, the voltage built up across the measuring condenser 50 should maintain a sufficient proportionality, between two limit potentials, to the voltage drop (E) across the terminals (21 and 30) of the potentiometer 22. When charging the condenser with a current of a given voltage, the condenser voltage increases in accordance with a non-linear rate of change, as exemplified by curve $v$ in Fig. 2 showing the voltage drop in dependence upon the charging time. In the diagram, E represents the magnitude of the driving voltage derived from the potentiometer. It will be seen that if the highest measuring voltage to be obtained at the condenser 50 is kept much lower than the potentiometer voltage, the condenser voltage E' remains within the initial portion of the curve $v$ and increases virtually in linear proportion to the charging time.

For this reason, the constants of the condenser circuit are preferably so chosen that the lowest expected voltage drop in the potentiometer resistor 22 is several times larger than the highest voltage of the condenser 50, i. e., the magnitudes of the resistances in the potentiometer-condenser circuit relative to the capacity of the condenser should be dimensioned in accordance with the desired time constant. The variable resistance device 33 permits adjusting the time constant in accordance with the selected anode voltage of the X-ray tube, and is preferably connected with the voltage selector 14, for instance, by a mechanical transmission as represented (in broken lines) at 90. Such a connection has the advantage that the charging circuit of the condenser is automatically adjusted when setting the desired anode voltage (kilovoltage) of the X-ray apparatus. For instance, when selector 14 is set for a low kilovoltage, say 30 kv., the contact 32 of device 33 inserts a higher resistance, that is, a greater number of resistance steps into the charging circuit as when the selector is set for a higher voltage, for instance of 70 kv.

The diagram of Fig. 3 exemplifies an operation of an X-ray apparatus and refers to a case where four successive exposures are made stressing the tube cumulatively up to its maximum safe heat capacity. The thermal load L is shown by curve $h$ in dependence upon time. In the example, the first exposure stresses the tube up to the condition represented by point A of curve $h$. The subsequent exposures increase the thermal load to B, C and D, the latter being reached after the fourth exposure and corresponding to the safe maximum load shown as L=50,000. An immediately following additional exposure would cause overloading. Hence, the tube must now be permitted to cool, following the declining branch of curve $h$, until in the example the thermal load becomes zero.

As explained in the foregoing, the constants of the charging circuit are so chosen that the voltage built up across the condenser 50 corresponds to the energy supply and hence to the production of anode heat in the X-ray tube. The recooling of the anode represented by the declining branch of curve $h$ follows an exponential relation between temperature and time. The voltage decay of a condenser discharged over an ohmic resistor involves also an exponential voltage-to-time relation. Consequently, the cooling of the X-ray anode can be initiated with high accuracy by properly dimensioning the leakage resistor 60.

The purpose of the control tube 61 is to block the resistor 60 from the discharging circuit during the time of charging shocks (exposures) and to prevent a voltage division between the resistors 51, 34 and 60. During a charging shock, the voltage drop in resistor 51 builds up a negative bias on the control grid 64 in tube 61, thus producing the blocking effect.

As a result of the above-described operation of the measuring network, the voltage across condenser 50 and the indication effected by the meter 80 portray the thermal condition of the X-ray tube and hence, in the example underlying the diagram of Fig. 3, are also represented by curve $h$ in the diagram.

In order to give an example of numerical values, reference is again made to the above-mentioned type of X-ray tube having a maximum safe heat capacity of 50,000 units and a cooling rate of 10,000 units per minute, these values applying in fact to one of the available tube types (rotating anode). Assuming that the kilovoltage of the X-ray tube is adjustable between 30 and 90 kv., the constants of the measuring system shown in Fig. 1 may be chosen as follows: Resistance 22 may have 1700 ohms, resistance 34 a total of 12 megohms, resistance 60 may have 50 megohms, while 6 megohms may be chosen for resistance 51 at a capacity of condenser 50 of 6 mf., using the tube types R. C. A. 84 at 36, R. C. A. 57 at 61, and R. C. A. 45 at 70, or equivalent tube types.

According to a preferred embodiment of the invention, the scale of the indicating instrument is so marked that the instrument, when not using the X-ray tube, indicates a value corresponding to the total heat storage capacity of the X-ray tube, for instance 50,000 units, while the reading decreases to lower values when operating the tube, depending upon the corresponding reduction of the remaining safe heat capacity of the tube. For instance, at a total capacity of the X-ray tube of 50,000 units, an exposure of 500 ma., 60 kv. and $\frac{1}{10}$ second will cause the meter to read $50,000-(500.60.\frac{1}{10})=47,000$ units at the termination of the exposure. During subsequent exposures, the reading of the meter will decrease accordingly until, eventually, it will show zero, thereby indicating that the tube can take no further exposures without overheating. In intervals between exposures, the reading will increase at a rate in proportion to the cooling rate of the X-ray tube of, for instance, approximately 10,000 units per minute. At any instant, the operator can determine from the instrument reading whether the tube is ready for an exposure by multiplying the kilovolts, milliamperes and seconds of the intended exposure, and checking whether the product is within the instrument reading. For example, if the operator intends to use 60 kv. and 500 ma. during $\frac{1}{2}$ of a second, the meter must read at least $60.500.\frac{1}{2}=15,000$. If the meter reads less than 15,000, the operator will have to wait until the tube has cooled down and the meter indication declined sufficiently to permit an additional energy input of 15,000 units.

It will be understood that the X-ray apparatus and measuring system exemplified in the foregoing can be modified in various respects without departing from the scope of this invention. For instance, when the tube load is measured by another integrating measuring system connected with the energizing network of the X-ray tube, the provision of circuit means or other devices for reducing the measured integral energy magnitude at a rate corresponding substantially to the cooling rate of the tube would likewise afford a resultant effect or instrument reading indicative of the thermal condition of the tube, substantially in accordance with the operation set forth in the foregoing. It is preferred, however, to employ as the integrating element a capacitor, and as the dissipation-simulating element a leakage resistance because of the reliability, adjustability, simplicity and little space requirements of electrical measuring systems of this type.

It will thus become obvious to those skilled in the art that an X-ray system is herein provided in which the load condition of an X-ray tube can be readily determined by an operator simply by glancing at a meter. Since the meter at any moment gives an indication of the load condition of the tube, the operator can readily discern what subsequent loading can be applied to the tube without a detrimental overloading thereof.

Although one specific embodiment of the present invention has been shown and described, it is to be understood that other modifications thereof can be made without departing from the spirit and scope of the appended claims.

I claim:

1. In combination with an X-ray apparatus having an X-ray tube and electric circuit means connected with said tube for supplying energy thereto, a measuring system comprising energy accumulating means connected to said circuit means for accumulating energy proportional to the energy supplied to said tube, simultaneously with energization of the latter, discharge means connected with said energy accumulating means for reducing the accumulated energy substantially in accordance with the heat dissipation in said tube, and means connected to said energy accumulating means for indicating the energy accumulated therein at any moment as a measure of the load condition of said tube.

2. In combination with an X-ray apparatus, a measuring system comprising energy accumulating means electrically connected to said X-ray apparatus for accumulating electrical energy therein proportional to the energy consumption of said X-ray apparatus simultaneously with energization of the latter, means connected to said first mentioned means for consuming the energy accumulated therein at a rate corresponding to the heat dissipation in said X-ray apparatus, and means connected to said first mentioned means for indicating the amount of energy accumulated therein at any given moment as a measure of the thermal condition of said X-ray apparatus.

3. In combination with an X-ray apparatus, a measuring system comprising a capacitor connected with the X-ray apparatus so as to be charged during the exposure periods with current dependent upon the energy consumption of said apparatus, a leakage path connected with said capacitor and having a time constant substantially corresponding to that of the heat dissipation in said X-ray apparatus, and voltage-measuring means connected with said capacitor and comprising an instrument for indicating the voltage built up across said capacitor as a measure of the load of the X-ray apparatus.

4. In combination with an X-ray apparatus, a measuring system comprising a capacitor connected with the X-ray apparatus so as to be charged during the exposure periods with current dependent upon the energy consumption of said apparatus, a leakage resistance disposed in parallel to said capacitor for discharging said capacitor in accordance with the heat dissipation in said apparatus, and voltage-measuring means connected with said capacitor and comprising an instrument for indicating the voltage built up across said capacitor as a measure of the thermal load condition of the X-ray apparatus.

5. In combination with an X-ray apparatus having an X-ray tube and an operating network for energizing said tube, a measuring system comprising a capacitor, a charging circuit connecting said capacitor with said network so as to charge said capacitor with current depending upon the energy supplied to said tube, a leakage resistance connected with said charging circuit for discharging said capacitor and being rated in accordance with the heat dissipation of said tube, and measuring means connected with said capacitor for determining the capacitor voltage as indicative of the thermal condition of said tube.

6. In combination with an X-ray apparatus having an X-ray tube and an operating network for energizing said tube, a measuring system comprising a capacitor, a charging circuit connecting said capacitor with said network so as to charge said capacitor with current depending upon the energy supplied to said tube, variable resistance means disposed in said charging circuit for adjusting the time constant of the latter, leakage means connected with said capacitor for discharging it at a rate similar to that of the heat dissipation of said tube, and measuring means connected with said capacitor for determining the capacitor voltage as indicative of the thermal condition of said tube.

7. In combination with an X-ray apparatus, a measuring system comprising a capacitor connected with the X-ray apparatus so as to be charged during the exposure periods with current dependent upon the energy consumption of said apparatus, circuit means connected with said capacitor for discharging the latter and being so rated as to simulate the cooling conditions of said apparatus, a control device responsive to the charging of said capacitor for blocking said discharging circuit means during charging periods, and voltage-measuring means connected with said capacitor and comprising an instrument for indicating the voltage built up across said capacitor as a measure of the thermal load condition of said apparatus.

8. The combination with an X-ray apparatus having an X-ray tube, a network for supplying energy to said tube, and selector means in said network for adjusting said energy, of a measuring system for determining the load condition of said tube comprising a capacitor, a charging circuit connecting said capacitor and said network for charging said capacitor in dependence upon the magnitude and during the supply periods of said energy, said charging circuit containing variable resistance means for adjusting its time constant, said resistance means being connected with said selector means of said network so as to be adjusted automatically in accordance with the setting of said selector means, a leakage path connected with said capacitor and having a time constant substantially corresponding to that of the heat dissipation in said X-ray apparatus, and measuring means connected with said capacitor for determining the capacitor voltage as a measure of the load of said tube.

9. An X-ray apparatus, comprising an X-ray tube, a network for supplying rated anode energy to said tube, potentiometric circuit means arranged in said network to produce a voltage proportional to said energy, a condenser connected with said circuit means to be charged by said voltage, resistance means inserted between said condenser and said device whereby the highest voltage built up across said condenser remains several times lower than the voltage of said potentiometric circuit means, a resistance arranged across said condenser for discharging it at a rate corresponding to that of the heat dissipation of said tube, and voltage-measuring means connected with said condenser for determining the condenser voltage as a measure of the thermal condition of said tube.

10. An X-ray apparatus, comprising an X-ray tube, a network for supplying rated anode energy to said tube, a voltage source associated with said network to produce a voltage proportional to said anode energy, a charging circuit containing a condenser and resistance means and being connected to said voltage source for charging said condenser in dependence upon said energy supply and at a rate corresponding to the production of anode heat in said tube, a resistor connected with said charging circuit for discharging said condenser at a rate corresponding to the anode heat dissipation of said tube, a control tube connected with said resistor for blocking it from said condenser responsive to the flow of charging current from said source to said condenser, and voltage-measuring means connected with said condenser for determining its voltage as an indication of the heat condition of said tube.

11. An X-ray apparatus, comprising an X-ray tube, an adjustable current source for supplying anode current of selected voltage and intensity to said tube, an intermediate transformer having a primary connected with said source and a high voltage secondary connected with said tube, said secondary comprising two sections arranged in series and grounded at their midpoint, a potentiometer resistance inserted between said sections, a charging circuit connected with said potentiometer resistance to derive therefrom a voltage proportional to the anode current of said tube, said circuit containing a condenser and a variable resistor in series-connection for producing a voltage across said condenser at a rate corresponding to the integral of said anode current over its flow period, a leakage resistor connected with said condenser for discharging it at a rate corresponding to the dissipation of anode heat of said tube, and voltage-measuring means connected with said condenser for determining its voltage as an indication of the heat condition of said tube.

12. The combination with an X-ray apparatus having an X-ray tube, of an electric integrating measuring system electrically connected with said apparatus for effecting a continuous indication dependent on the energy consumption of said tube, and means connected with said measuring system for modifying said indication at a rate corresponding to the heat dissipation of said tube, whereby the resultant indication at any given moment is a measure of the thermal condition of said tube.

13. The combination with an X-ray apparatus having an X-ray tube and a network for supplying energizing current to said tube, of an integrating measuring system connected with said network for producing a measuring magnitude dependent on the energy supplied to said tube, means connected with said measuring system for reducing said magnitude at a rate corresponding to the heat dissipation in said tube, and a measuring instrument disposed in said system responsive to the resultant magnitude for effecting a variable indication representing at any given moment the thermal condition of said tube.

14. The combination with an X-ray apparatus having an X-ray tube and a network for supplying energizing current to said tube, of an integrating measuring system connected with said network for producing a measuring magnitude dependent on the energy supplied to said tube, means connected with said measuring system for reducing said magnitude at a rate corresponding to the heat dissipation in said tube, and a measuring instrument disposed in said system responsive to the resultant magnitude for effecting a variable indication representing the thermal condition of said tube, said instrument being calibrated in heat units and having an indicating scale marked so as to show the maximum safe heat capacity of said tube when the latter is cold and the available reduced capacity down to the zero value after said tube has been in operation.

15. A load meter system for use in connection with the energizing A. C. network of an X-ray tube, comprising a circuit element to be connected with the energizing network, a charging circuit connected to said circuit element and containing in series-arrangement a condenser, resistance means and a tube rectifier for charging said condenser in dependence upon the energy supplied to said tube and at a rate corresponding to the anode heat developed in said tube by said energy, a leakage resistor connected with said circuit for discharging said condenser at a rate corresponding to the anode heat dissipation of said tube, a relay tube connected with said resistor and said circuit for blocking said discharge in response to said circuit delivering a charge to said condenser whereby said discharges are limited to inoperative periods of said tube, a tube voltmeter connected with said condenser for determining the voltage across said condenser as a measure of the heat condition of said tube, and a transformer having a plurality of secondary windings connected with said rectifier tube, control tube and tube voltmeter respectively so as to form the common current source of said tubes.

LOUIS L. WEISGLASS.